United States Patent
Mazza et al.

(10) Patent No.: US 7,127,442 B2
(45) Date of Patent: Oct. 24, 2006

(54) IRONCLAD NOTIFICATION OF LICENSE ERRORS

(75) Inventors: Bruce P. Mazza, Thornton, CO (US); Phillip A. Whelan, Thornton, CO (US); William T. Walker, Evergreen, CO (US); Lawrence J. Morgan, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 748 days.

(21) Appl. No.: 10/405,176

(22) Filed: Apr. 1, 2003

(65) Prior Publication Data

US 2004/0199760 A1 Oct. 7, 2004

(51) Int. Cl.
B06F 17/60 (2006.01)

(52) U.S. Cl. ............................................. 706/59; 706/52
(58) Field of Classification Search ................ None
See application file for complete search history.

(56) References Cited

U.S. PATENT DOCUMENTS

| | | | |
|---|---|---|---|
| 4,937,863 A | 6/1990 | Robert et al. | |
| 5,157,663 A | 10/1992 | Major et al. | |
| 5,204,897 A | 4/1993 | Wyman | 380/4 |
| 5,307,481 A | 4/1994 | Shimazaki et al. | |
| 5,329,570 A | 7/1994 | Glassmacher et al. | 379/189 |
| 5,408,649 A | 4/1995 | Beshears et al. | |
| 5,671,412 A | 9/1997 | Christiano | |
| 5,745,879 A | 4/1998 | Wyman | 705/1 |
| 5,790,664 A | 8/1998 | Coley et al. | 380/4 |
| 5,905,860 A | 5/1999 | Olsen et al. | 395/187.01 |
| 5,978,565 A | 11/1999 | Ohran et al. | |
| 6,108,703 A | 8/2000 | Leighton et al. | 709/226 |
| 6,148,415 A | 11/2000 | Kobayashi et al. | |
| 6,513,121 B1 | 1/2003 | Serkowski | 713/201 |
| 6,574,612 B1 | 6/2003 | Baratti et al. | |
| 6,584,454 B1 | 6/2003 | Hummel et al. | |
| 6,850,958 B1 | 2/2005 | Wakabayashi | |
| 6,854,010 B1 | 2/2005 | Christian et al. | |
| 2002/0164025 A1* | 11/2002 | Raiz et al. | 380/231 |
| 2004/0044629 A1* | 3/2004 | Rhodes et al. | 705/59 |

(Continued)

FOREIGN PATENT DOCUMENTS

EP 1 071 253 A1 1/2001

OTHER PUBLICATIONS

U.S. Appl. No. 10/231,957, filed Aug. 30, 2002, Serkowski et al.

(Continued)

*Primary Examiner*—Creighton Smith
(74) *Attorney, Agent, or Firm*—Sheridan Ross P.C.

(57) ABSTRACT

A telecommunication system comprises a computational component operating in a first licensing mode. The system includes a license manager 113 that identifies the occurrence of a predetermined licensing event and a mode setting agent 124 that notifies a user of the predetermined licensing event and determines whether or not the user acknowledges receipt of the notice within a selected time period. When the user fails to acknowledge receipt of the notice within the selected time period, the mode setting agent causes the computational component to operate in a second licensing mode, and, when the user acknowledges receipt of the notice within the selected time period, causes the computational component to operate in a third licensing mode. The first, second, and third licensing modes provide for a first, second, and third sets of operations, respectively. Each of the first and third sets of operations differ from the second set of operations.

35 Claims, 7 Drawing Sheets

U.S. PATENT DOCUMENTS

2004/0044630 A1* 3/2004 Walker et al. ............... 705/59
2004/0044901 A1* 3/2004 Serkowski et al. ......... 713/200

OTHER PUBLICATIONS

U.S. Appl. No. 10/232,507, filed Aug. 30, 2002, Serkowski et al.
U.S. Appl. No. 10/232,508, filed Aug. 30, 2002, Rhodes et al.
U.S. Appl. No. 10/231,999, filed Aug. 30, 2002, Walker et al.
U.S. Appl. No. 10/232,906, filed Aug. 30, 2002, Walker et al.
U.S. Appl. No. 10/232,647, filed Aug. 30, 2002, Walker et al.
U.S. Appl. No. 10/278,504, filed Oct. 22, 2002, Goringe et al.
U.S. Appl. No. 10/348,107, filed Jan. 20, 2003, Walker et al.
U.S. Appl. No. 10/377,369, filed Feb. 27, 2003, Chavez.
U.S. Appl. No. 10/387,182, filed Mar. 11, 2003, Walker.

* cited by examiner

IRONCLAD NOTIFICATION OF LICENSE ERRORS

FIELD OF THE INVENTION

The present invention relates generally to the licensing of computational components and specifically to the licensing of computational components in telecommunication systems.

BACKGROUND OF THE INVENTION

To protect software manufacturers' copyrights in software sold to the public, manufacturer's commonly license software to the purchaser. Additionally, in many applications the purchaser has elected to pay only for certain features of software which must be selectively enabled by the manufacturer. In particular, each release or version of a particular software package for a customer premise telecommunication switching system contains a large number of features, and most customers elect to pay for only a subset of the total number of features. Features in a telecommunications switching system refer to certain specialized operations such as call hold, call transfer, automatic route selection, etc. An ongoing problem in the art is to prevent newer versions of software from being pirated and used on unauthorized hardware and/or otherwise authorized customers from actuating features for which the customer has not paid.

A number of methods have been developed to protect against such unauthorized use of software.

In one method, passwords, that allow only authorized individuals to have access to the telecommunication switching system, are used to control enablement of features or new software versions. This method is inflexible and inconvenient for customers as an authorized technician must be scheduled to enable the features, can be circumvented by a person misappropriating or misusing the password, and does not provide for periodic license verification during system operation.

In another method, a key is required to enable the software program. This solution does not solve the copying problem because the key is normally printed on the packaging of the software, and anyone can install the software as many times as they wish, however illegal it may be.

In yet another method, a special piece of hardware or "dongle" is used. The dongle is a special piece of hardware that connects to the serial or parallel port of the computer. The software running on the computer sends a random number to the dongle. The dongle performs a secret computation and returns a result. The software makes a like computation; if the two computations match, the software continues to run. To work satisfactorily, the response must include feature and version information. The use of the dongle is cumbersome when it fails. In the event that the dongle fails, the system is down until a new dongle can be physically obtained on site. Also, once made the dongle is fixed. If it was used for feature activation, a new dongle is required for each additional feature that is purchased.

A further method is to freely distribute CD-ROM disks. When the CD-ROM is inserted into a computer, the computer automatically connects to a remote server via the Internet or a dial-up connection to receive a machine-specific key. The key unlocks the software so that it can be utilized on that computer. The remote server also obtains the necessary payment information from the computer user. This method does not function well for a telecommunication switching system since it does not provide for the authorization to use different features of the same software application nor is it dependent on the version of the software being requested. In addition, it does not provide the necessary authorization of personnel to make such a request.

Another method requires the software, upon installation or first execution, to record serial number information (e.g., medium access control or MAC address) regarding predetermined hardware components of the computer system. The software permits the user a specified number of hardware serial number changes before it disables itself. This method, though effective, is unfair to users who, over time, legitimately exceed the number of permitted serial number changes through reuse of the software on a number of different systems and/or periodic replacement of some of the predetermined hardware components in a given system to upgrade or maintain the system.

The drawbacks of the various licensing methods discussed above are addressed by the licensing methods discussed in detail in copending U.S. patent applications entitled "Securing Feature Activation in a Telecommunication System", Ser. No. 09/357,679, filed Jul. 20, 1999, to Serkowski; "License Modes in Call Processing", Ser. No. 10/232,508, filed Aug. 30, 2002; "Remote Feature Activator Feature Extraction", Ser. No. 10/232,906, filed Aug. 30, 2002; "Flexible License File Feature Controls", Ser. No. 10/231,999; "License File Serial Number Tracking", Ser. No. 10/232,507; "Licensing Duplicated Systems", Ser. No. 10/231,957; and "Software Licensing for Spare Processors", Ser. No. 10/232,647, each of which is incorporated herein by this reference. In the methods disclosed in these patent applications, a valid license file is required to run a computational component. The license file contains a serial number that must be present on the hardware that is to execute the licensed software for the license to be valid and the software to be executable. In telecommunication applications, for example, the serial number of the control processor must be in the license file for the control processor to run the licensed software.

The methodology of the latter patent application provides for three licensing modes when a defined condition(s) is found to exist, namely the LICENSE-NORMAL mode (in which a license manager has found, inter alia, that a valid license is properly installed, the license file contains a serial number that matches the serial number of the processor, the software name and version/release of the telecommunication application matches that in the license file, the license has not expired, the offer category in the feature mask matches the translation, and the feature usage in translation does not exceed limits in the feature mask), the LICENSE-ERROR mode (in which the license manager has found, inter alia, one or more of the following to be true: no valid license is properly installed, the license file contains a serial number that does not match the serial number of the processor, the license has expired, and the feature usage exceeds limits), and in the NO-LICENSE mode (in which the license manager has found that (i) a license error timer to be expired and one or more of the following to be true: there is no valid license installed on the system, the feature usage exceeds limits, the license file contains a serial number that does not match the serial number of the processor, and the license is expired, (ii) the name and/or version of the telecommunication application to not match the name and/or version in the license file; and/or (iii) the offer category in the feature mask to not match translation. The LICENSE-ERROR and NO-LICENSE modes may be returned to the LICENSE-NORMAL mode by correction of the errors that caused the former two modes to be triggered.

The license modes have differing operational consequences. In the LICENSE-NORMAL mode, normal call processing is performed. In the LICENSE-ERROR mode, normal call processing is performed but only for a predetermined period of time or grace period. The license error timer is used to monitor the grace period. In the NO-LICENSE mode, only limited call processing is permitted.

A drawback of the above licensing methodologies is that the telecommunication system can enter the NO-LICENSE mode without notification of appropriate personnel of the operator. Although entry into the LICENSE-ERROR mode activates a number of warnings to notify the operator of the mode change, it is still possible that the warnings will not be brought to the attention of authorized personnel in time for the errors to be corrected. An unexpected loss of call processing in call-dependent businesses can have severe consequences for the business, including lost employee productivity and business opportunities.

SUMMARY OF THE INVENTION

These and other needs are addressed by the various embodiments and configurations of the present invention. To prevent unexpected losses of service, the present invention provides a method and system that requires a user to acknowledge a warning or notification of a license error before a licensing mode of defined duration is initiated. At the conclusion of the timed licensing mode, all or part of the services provided to the user are disabled.

In a first embodiment of the present invention, a method for protecting actuation of a computational component (operating in a first licensing mode such as the LICENSE-NORMAL mode) in a telecommunication system is provided. The method includes the steps of:

(a) identifying the occurrence of a predetermined licensing event (e.g., a license error is discovered during a periodic licensing file check);

(b) notifying a system user or administrator of the predetermined licensing event;

(c) determining whether or not the user has acknowledged receipt of the notice within a selected time period. When the user fails to acknowledge receipt of the notice within the selected time period, the computational component is caused to operate in a second licensing mode (such as the LICENSE-ERROR-PENDING mode), and when the user acknowledges receipt of the notice within the selected time period, the computational component is caused to operate in a third licensing mode (such as the LICENSE-ERROR mode).

The computational components can be any entity capable of performing a task or executing instructions, e.g., a logic-containing board or chip such as an application specific integrated circuit or ASIC, a (control) processor, software, etc. In one configuration, the computational component is a license-controlled telecommunication application.

The first, second, and third licensing modes provide for a first, second, and third sets of operations, respectively. To provide the user an incentive to acknowledge receipt of the notice, the first and third sets of operations differ from the second set of operations. For example, the second set of operations, unlike the first and third sets of operations, can exclude or hinder the operation of one or more call processing features, cause specified types of system administration requests to be denied, and the like. As will be appreciated, the first, second, and third sets of operations can include a common subset of operations, such as selected call processing features or functions. For example, the common subset of operations can include a plurality of call vectoring, voice mail, call forwarding off net, DCS Internet working, enhanced conferencing, IP trunks, holiday vectoring, and automatic call distribution.

The predetermined licensing event can be any event the occurrence of which is associated with an unlicensed operation. For example, the predetermined event can be an attempt by unauthorized personnel to modify, copy or alter the computational component, the use of an unauthorized code, password, identifier, serial number, or key, and the use of the computational component in the absence of a valid license. In a telecommunication architecture, the licensing event is typically defined as one or more of a valid license not being properly installed, the license file containing a serial number that fails to match the serial number of the processor (simplex configuration) or a plurality of serial numbers that do not match the serial numbers of a similar plurality of processors (multiple processor configuration (e.g., duplex configuration)), the name and/or version number of the telecommunication application failing to match the name and/or version number in the license file, the license being expired, the offer category in the feature mask failing to match the translation of the switch/server, feature usage in the translation exceeding limits in the feature mask, and a spare processor being in the active state.

In one configuration, acknowledgment of the receipt of the notice within the selected time period causes a timer to be initiated. When a determined period of time has elapsed, the third licensing mode is changed to a fourth licensing mode (such as the NO-LICENSE mode). The fourth licensing mode is different from the first, second, and third licensing modes. In the fourth licensing mode, the features in the common set of features are disabled. For example, the computational component can permit only outgoing and incoming calls to and/or from a predefined set of numbers.

In one configuration, in the first licensing mode the computational component is validly licensed and in the second, third, and fourth licensing modes the computational component is not validly licensed.

To prevent a user from performing administrative changes to translation for a selected first telecommunication system on a separate, validly licensed, second telecommunication system, the method can include the further steps of:

(a) comparing a first identifier (such as a hardware serial number) associated with the first telecommunication system with a second identifier in translation information to be used for configuring the first telecommunication system;

(b) when the first and second identifiers are different, causing the computational component to operate in the third licensing mode even when the user fails to acknowledge receipt of the notice within the selected time period; and (c) when the first and second identifiers are the same, only causing the computational component to operate in the third licensing mode when the user acknowledges receipt of the notice within the selected time period. By linking the translation information to a unique identifier associated with the first telecommunication system, translation information from the second system cannot be used to configure the first system.

The method and system of the present invention can have a number of advantages. The present invention can prevent unexpected losses of service by requiring acknowledgment of the license-error notification by a system user. The incentive to cause the user to acknowledge the notification can be an inability to perform system administration or maintenance. When the notification is acknowledged, the countdown or count-up timer is started. Thus, the user determines when the timer is started and can choose to accept the disadvantage of operating in the second licensing mode in the event that the potential loss of service is too costly. For additional insurance against unexpected loss of service, the ability to acknowledge the notification can be limited to a subset of authorized users, such as system maintenance personnel.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
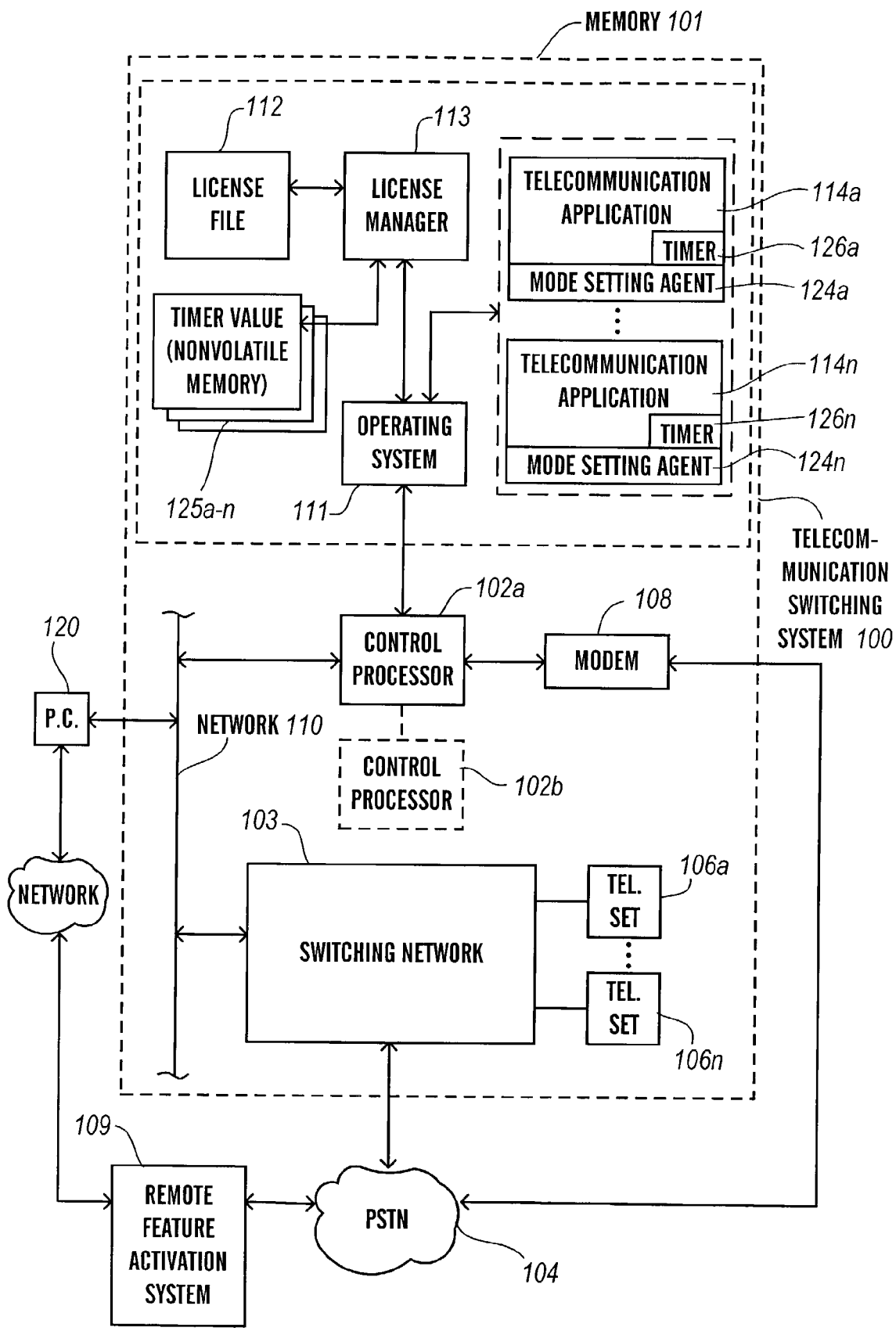
FIG. 1 depicts a telecommunication switching system according to an embodiment of the present invention.

FIG. 1 illustrates telecommunications switching system 100 interconnected to public telephone network 104. Telecommunications switching system 100 comprises telephone sets 106. The features and operations provided by telecommunication switching system 100 to telephones 106a–n and its interactions with public telephone network 104 are well known in the art. Illustratively, the switching system of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference, or Avaya Inc.'s DEFINITY™ private-branch exchange (PBX)-based ACD system.

One of the duplex control processors 102 executes telecommunication application 114a–n (each of which comprises a mode setting agent 124) via operating system 111 to perform the telecommunication functions and features. Primary and backup control processors 102a and b execute instructions in memory 101, such as license manager 113 and telecommunication applications 114a–n, and communicate with switching network 103 via network 110. One skilled in the art can readily envision that control processor(s) 102 can communicate with switching network 103 via a direct connection such as a connection via the processor bus of control processor(s) 102.

Operating system 111 is a conventional operating system allowing for the execution of applications such as telecommunication application 114 and for the intra-application communication of messages. The telecommunication application can be any application(s) and/or feature(s) used in telecommunication systems, such as DEFINITY™ by Avaya, Inc.

Personal computer (PC) 120 is utilized by service personnel to administer telecommunication switching system 100.

Switching (or server) network 103 provides all of the necessary telecommunication switching and interfacing that is required in telecommunication switching system 100.

License manager 113 periodically verifies that the telecommunication switching system 100 is being operated in accordance with pertinent licensing rules and disables the system 100 or an operational part of the system 100 when licensing rules are violated (or a predetermined licensing event occurs). During initialization of the switch software, during the restoration of translations, and periodically as the switch is running, a query is made by the telecommunication application to the license manager 113. The license manager 113 reads license file 112, compares the serial number(s) in the license file 112 with a serial number in the switch hardware, compares the software name and/or version in the license with the name and/or version of the telecommunication application 114a–n or operational part thereof, and, if a match occurs, delivers permission to run the telecommunication application 114a–n or operational part thereof with the feature mask in the license file. The feature mask controls revenue-associated options.

Figure 2:
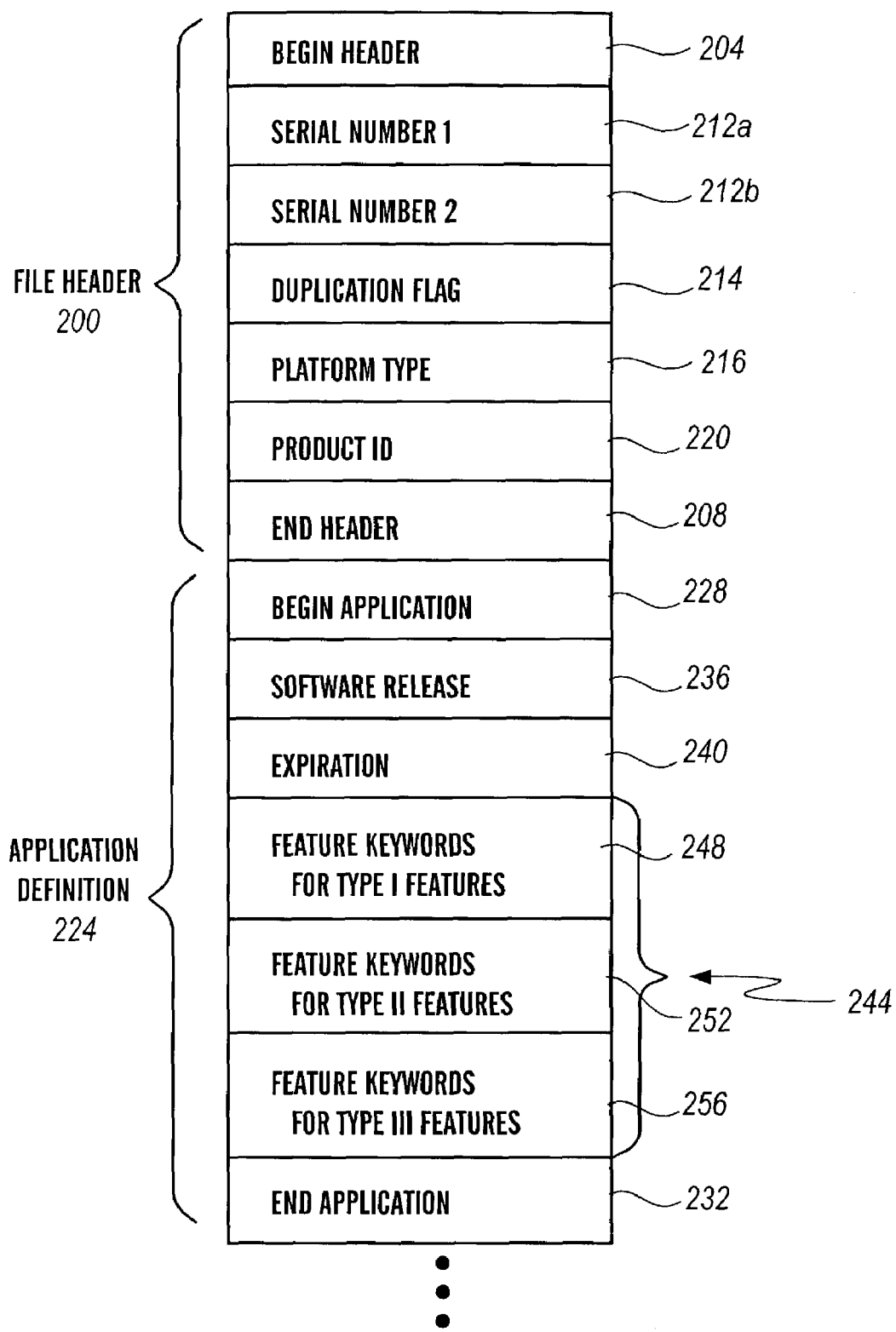
FIG. 2 depicts a license file according to another embodiment of the present invention.

Referring to FIGS. 1 and 2, the license file 112 includes a file header 200 which includes header beginning and ending fields 204 and 208 respectively, serial number fields 212a and b (each containing a serial number associated with one of control processors 102a and 102b), duplication flag field 214 (containing an indicator of whether there is a duplicated control processor (or two serial numbers) in the system 100, e.g., a simplex or duplex configuration), a platform type field 216 (containing first platform information such as the product type and name and/or version of product that the license is for), and a product identifier or PID field 220 (containing second platform information different from the first platform information such as a product identifier used at the platform level for accessing Access Security Gateway or ASG keys) and one or more controlled application definitions 224 each of which includes controlled application beginning (which names the application, e.g., "DEFINITY" ™ or "MULTI-VANTAGE"™ by Avaya, Inc.) and ending fields 228 and 232, respectively, a software release field 236 (identifying software release version for which the license is granted), an expiration field 240 (expiration date of the license), and a feature mask 244 (providing information relating to the features to be enabled). In some applications, the duplication flag field 214 is contained in each application definition 224 and not in the file header 200.

In one configuration, the feature mask is configured as discussed in detail in copending U.S. patent application Ser. No. 10/231,999, entitled "Flexible License File Feature Controls" to Walker et al., filed Aug. 30, 2002, and incorporated herein by this reference. The content of the mask controls what features are enabled or may be enabled on the product. There are three types of entries corresponding to fields 248, 252, and 256 in the feature mask.

The first type of entry (or Type I feature) in field 248 relates to those types of features that have a simple on/off state. The feature is either enabled or disabled. Each of these types of entries has two variables associated with it, namely a value and a lock. The value variable can be either on or off and the lock variable either locked or unlocked. Examples of features falling into this category include (in addition to the Type I features identified above in the background) Digital communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

The second type of entry (or Type II feature) in field 256 relates to those types of features that have a numeric value. The value can correspond to a numeric value and/or name kind of entry. Each of these types of entries has two values associated with it, namely a lower limit value and an upper limit value. The lower limit value is never greater than the upper limit value. Examples of features falling into this category include (in addition to the Type II features identified above in the background) logged-in automated call distribution or ACD agents, maximum currently registered IP stations, maximum administered IP trunks, offer category, maximum number of ports, maximum number of administered remote office trunks, and maximum number of mobile stations.

The third type of entry (or Type III feature) in field 256 relates to those types of features that have a product value (e.g., corresponding to a product name or type), a release number (e.g., referring to a product release identifier), and a numeric value (e.g., indicating an operational parameter associated with the product and/or release, such as how many ports are licensed and/or how many licenses for the product are granted. This type of feature allows other controlled applications to be executed. Like the second type of entry, each of these types of entries has two values associated with it, namely a lower limit value and an upper limit value. The lower limit value is never greater than the upper limit value.

When duplicated processors are used such as shown in FIG. 1, a separate license file can be saved for each processor or a common license file for both processors. Because duplicated processors share translation, typically only one copy of the license file is installed, though the file is saved to two flash cards (one for each processor). If either of the two processors is replaced, the license file must be replaced.

Referring again to FIG. 1, a remote feature activation system 109 generates the license file that is transmitted to the switching system 100 upon installation or provisioning of the system. Remote feature activation system 109 is discussed in detail in copending U.S. application Ser. No. 10/203,507, entitled "License File Serial Number Tracking" to Serkowski et al., filed Aug. 30, 2002, and incorporated herein by this reference. Alternatively, the license file is installed by authorized personnel via PC 120.

Modem 108 is directly connected to control processor 102 so that control processor(s) 102 can contact remote feature activation system 109 via public telephone network 104. Similarly, remote feature activation system 109 can establish a communication channel with control processor 102 via public telephone network 104 and modem 108. One skilled in the art can readily envision that modem 108 can be interconnected to control processor(s) 102 via LAN 110.

Each telecommunication application 114*a–n* can include a corresponding mode setting agent 124*a–n* to set the licensing mode of the system 100. The mode setting agent 124 can set one of three operational modes to the system 100.

In the LICENSE-NORMAL mode, the license manager has found that a valid license is properly installed, the license file contains a serial number that matches the serial number of the processor (simplex configuration) or a plurality of serial numbers that match the serial numbers of a similar plurality of processors (multiple processor configuration (e.g., duplex configuration)), the software name and version/release of the telecommunication application matches that in the license file, the license has not expired, the offer category in the feature mask matches the translation, the feature usage in translation does not exceed limits in the feature mask (e.g., a feature limit is a capacity value associated with a type 2 or type 3 feature), and if the processor is a wide area network (WAN) spare processor (WSP), survivable remote spare processor (SRP), or local spare processor (LSP), the processor is not active.

In the LICENSE-ERROR mode, the license manager has found one or more of the following: no valid license is properly installed, the license file contains a serial number that does not match the serial number of the processor (simplex configuration) or a plurality of serial numbers that do not match the serial numbers of a similar plurality of processors (multiple processor configuration (e.g., duplex configuration)), the license has expired, the feature usage exceeds limits (e.g., there are more ports translated than permitted by the port limit in the license file which can occur when translations are copied from another switch or when a new license file is installed that has lower limits than the previous license file) and the processor is a WSP, SRP, or LSP that is active. If there is a mismatch between the existing translation and the license file for a locked first type of entry the feature on/off state is simply updated to match the license and does not cause entry into LICENSE-ERROR mode. The LICENSE-ERROR mode is cleared by correcting the error that caused entry into the mode or by installing a valid license that is consistent with the configuration of the system 100. In the LICENSE-ERROR mode, the telecommunication application is permitted to run for a predetermined period of time or grace period. License error timer 126 (FIG. 1) is used to monitor the grace period. Each timer 126*a–n* is maintained by a corresponding telecommunication application in memory. In order to preserve the timer value across reboots, timer values 125*a–n* (each of which corresponds to a timer 126*a–n*) are saved once every hour in nonvolatile memory. The application 114 reads the timer values 125*a–n* from memory on bootup and uses them to set the correct timer value of the corresponding timer 126*a–n* in the application's memory.

In one configuration, all call processing functions of the telecommunication application are permitted to run during the LICENSE-ERROR MODE. Thus, the customer will realize the same level of service in both the LICENSE-NORMAL and LICENSE-ERROR modes.

In the LICENSE-ERROR-PENDING mode, the license manager has found that (i) one or of the errors for a LICENSE-ERROR mode to be in effect is in effect; (ii) the customer or user of the telecommunication switching system 100 has failed to acknowledge the notification of the error(s); (iii) the serial number identified in the translation information matches the serial number(s) of the (duplicated or unduplicated) processor(s); and (iv) the timer 126 corresponding to telecommunication application 114 has not been initiated. In the LICENSE-ERROR-PENDING mode, the customer will realize indefinitely the same level of primary call processing service as in the LICENSE-NORMAL and LICENSE-ERROR modes but there may be other administrative functions that are hindered or blocked altogether.

The licensing mode is changed automatically to the LICENSE-ERROR mode when the user acknowledges the notification. A suitable incentive is provided for the user to acknowledge the notification. The incentive can cause user annoyance or discomfort. For example, the application 114 could block specific displays on attached terminals, delay dial tone after a device is placed in the off-hook state, block performance of administration requests, block logging onto the system 100, show error messages on user displays, and the like. As will be appreciated, "administration" refers to operations for configuring the telecommunication system(s) for use. Examples of administration requests include requests to add additional stations, change routing patterns, change features available to a given station, display system status, and add additional trunks.

In the NO-LICENSE mode, the license manager has found that (i) the corresponding license error timer 126a–n is expired and one or more of the following: there is no valid license installed on the system, the feature usage exceeds limits, the license file contains a serial number that does not match the serial number of the processor (simplex configuration) or a plurality of serial numbers that do not match the serial numbers of a similar plurality of processors (multiple processor configuration (e.g., duplex configuration)), the license is expired, and the processor is a WSP, SRP, or LSP that is active; (ii) the name and/or version of the telecommunication application does not match the name and/or version in the license file; and/or (iii) the offer category in the feature mask does not match translation. In the NO-LICENSE mode, all new call originations (except alarm calls (e.g., 911 calls) and calls to an administered emergency number) are denied and all incoming calls (except calls to an administered number) are denied. This mode is cleared by correcting the error that caused entry into the mode or by installing a valid license that is consistent with the configuration of the switch.

The operation of the license manager 113 and mode setting agent 124 will now be discussed with reference to FIGS. 3A and 3B and 4A and 4B. The process begins in step 300 of FIG. 3A when the mode setting agent 124 sends, such as at initialization of the application, periodically during execution of the application, or when a new license is installed, an encrypted message to the license manager 113 via operating system 111. The encrypted message includes a request for permission to run, a request for a list of permitted features, the name and version number for the telecommunication application 114 (making the request), and the date and time of the request. The request may also include a request for the value of the timer 126.

Figure 4A:
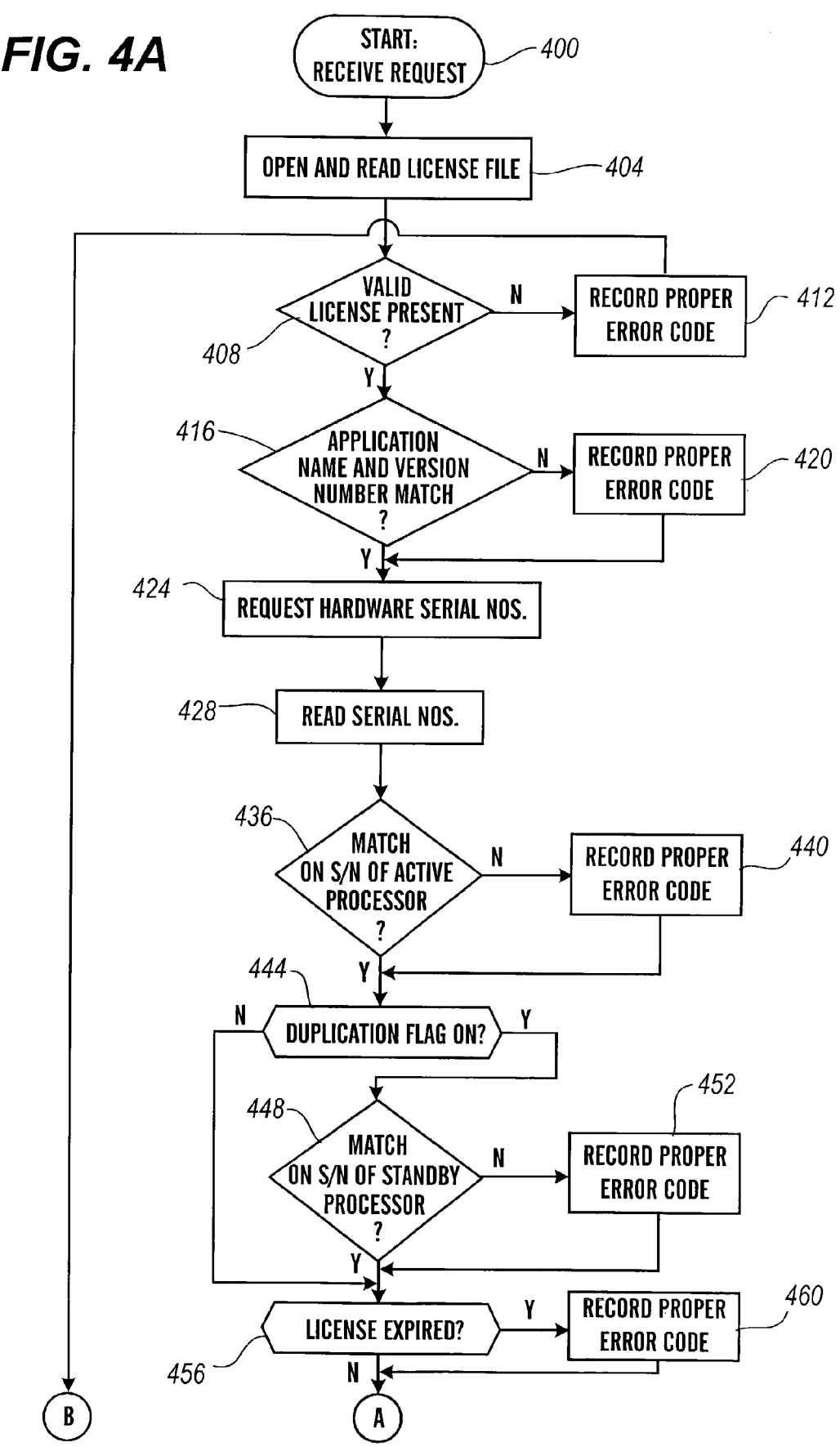
FIGS. 4A and 4B are flow charts depicting an algorithm of the license manager according to a further embodiment of the present invention.
Figure 4B:
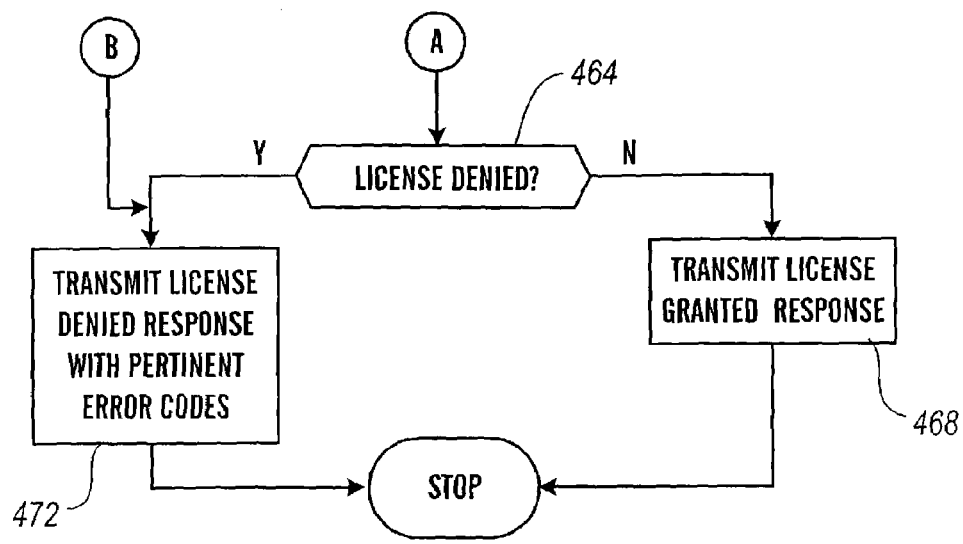

The request is received by the license manager 113 in step 400 of FIG. 4A. The license manager 113 decrypts the request and in response to the encrypted message attempts to open, decrypt, and read the license file 112 in step 404. In step 408, the license manager determines whether or not the license file is present and valid. This query determines whether there is a license file available, whether the license file is readable, and whether the license file is in the proper format. If any one of these checks has a negative result, the manager 113 concludes that the license file is invalid. When the license file is invalid, the manager 113 records in step 412 the error code corresponding to the fact of and/or reason for license file invalidity and proceeds to step 472 (discussed below).

In step 416, the manager 113 reads license file 112 to obtain the list of permitted features, name and/or version number of telecommunication application 114, and the serial number(s) of control processors 102a and 102b. For security reasons, the license file is stored in an encrypted form. As will be appreciated, the encryption can be performed using one or more keys. The manager 113 then determines whether or not the name and/or version number for the telecommunication application 114 matches the name and/or version number in the decrypted license file. If not, the manager 113 in step 420 records the error code corresponding to an unmatched name and/or version number.

In step 424, the manager 113 forwards a serial number request to each of the processors 102a and 102b. Control processors 102a and b each are assigned a unique electronically readable serial number that is set during board manufacture. If one or both of the processors 102 fails to respond to the serial number request after a predetermined time period and/or after a predetermined number of requests, manager 113 assumes that the processor 102 is unavailable. It is typically desired to resend serial number requests in the event that no response is received, as the processor may be resetting (e.g., after a firmware update) at the time of the initial serial number request.

In step 428, the manager 113 determines whether each of the processors 102a and 102b has responded and is therefore present. If not, the manager 113 in step 432 records the proper error code for the corresponding unavailable processor.

In step 436, the manager 113 determines if the serial number of the active processor matches either of the two serial numbers in the license file. If not, the manager 113 in step 440 records the proper error code for an unmatched serial number.

In step 444, the manager 113 determines whether the duplication flag is on or set. The duplication flag may be configured in any suitable manner, such as a bit having two values, 0 and 1, each of which indicates a different predetermined duplication state. For example, a "0" value indicates no duplication and a "1" value duplication. When the duplication flag is on, the manager 113 proceeds to step 448 and determines whether the serial number of the standby processor 102b matches either of the serial numbers in the license file. When the system is a duplex system and one or both serial numbers of the processors do not match either of the serial numbers in the license file, the manager 113 in step 452 records the proper error code for an unmatched duplicated processor serial number.

In the event that the duplication flag is off or after either of steps 448 or 452, the manager 113 determines in step 456 whether or not the license is expired. When the expiration date in the license file is earlier than the current date and time, the license is considered to be expired. When the license is expired, the manager 113 in step 460 records the proper error code for an expired license.

In step 464, the manager 113 decides whether the license is to be denied or granted. The license is denied when one or more error codes is recorded during the preceding steps. The license is granted when no error codes are recorded.

When the license is granted, the manager 113 generates a license granted response in step 468. The response includes an indication that the license is granted and the feature mask of the license file. The message is encrypted and forwarded to the mode setting agent 124.

When the license is denied, the manager 113 generates a license denied response in step 472. The response includes an indication that the license is denied, the error code(s) corresponding to the reason(s) for license denial, and the feature mask. The feature mask is not returned if the error is "no valid license present" since there is no feature mask to return without a valid license. When the license is denied for more than one reason, error codes for all of the reasons for license denial are included in the license denial response. The message is encrypted and forwarded to the mode setting agent 124.

Referring again to FIG. 3A, the mode setting agent 124 in step 304 receives the encrypted license response from the manager 113 and decrypts the response. As discussed below, the mode setting agent 124 parses through the various fields of the license response to set the license mode.

In step 308, the agent 124 determines whether the manager 113 found a valid license to be present. If a valid license is not present, the agent 124 determines in step 312 whether the current license mode of the system 100 is the NO-LICENSE mode. When the current mode is not the NO-LICENSE mode, the agent proceeds to decision diamond 316 discussed below. When the current mode is the NO-LICENSE mode, the agent leaves the system in the NO-LICENSE mode in step 320. If a valid license is present, the agent 124 proceeds to step 324.

In step 324, the agent determines whether the manager found that the application name and/or version matched the name and/or version in the license file. If not, the agent proceeds to step 320 in which the mode is set to the NO-LICENSE mode. If so, the agent proceeds to step 328.

In step 328, the agent determines whether the manager found that the offer category matches the translation. If not, the agent proceeds to step 320 in which the mode is set to the NO-LICENSE mode. If so, the agent proceeds to step 332.

In step 332, the agent determines whether the value of the license error timer 124 is greater than zero. The application 114 maintains the license error timer value in memory. When the license timer value is zero, the agent proceeds to step 336 (discussed below), and when the license timer value is greater than zero the agent proceeds to step 340 (also discussed below).

In one configuration, the value of the license error timer value is periodically saved in nonvolatile memory of each of the processors so that the timer can be preserved across system resets. To make this possible, the mode setting agent makes not only a license file request but also a timer save request at predetermined intervals. The license timer value passed to the manager 113 for storage is set as follows: (a) if the system 100 is in LICENSE-NORMAL or LICENSE-ERROR-PENDING modes, the license timer value shall be the full grace duration of period (6 days, or 144 hours in the case of DEFINITY), (b) if the system 100 is in LICENSE-ERROR mode, the license timer value saved shall be the time remaining on the corresponding license error timer 126a–n, and (c) if the system 100 is in NO-LICENSE mode, the corresponding license timer value saved is zero.

At initialization or any other time that the value is not available in memory, the agent issues a timer request to the license manager 113. To generate a timer response, the manager 113 queries each of the processors for the stored timer value. The lowest of these values (the value closest to expiration) is passed back to the agent in the timer response message. If any of the timer values from the processors are corrupted or if no processor responds with a timer value, the value in the timer response message to the agent is zero (indicating that the timer is expired). The agent uses the timer value in the response to set the timer value in memory.

Returning to FIG. 3A the agent in step 340 determines whether or not the manager 113 found that the serial number(s) match. When the serial number(s) do not match, the agent proceeds to decision diamond 316. When the serial number(s) match, the agent proceeds to step 344.

The agent in step 344 next determines if the manager found that the feature limits were being exceeded. When the limits are being exceeded, the agent proceeds to decision diamond 316. When the limits are not being exceeded, the agent proceeds to step 348.

In step 348, the agent determines whether the manager found that the license is expired. When the license is expired, the agent proceeds to decision diamond 316. When the license is not expired, the agent proceeds to step 352.

The agent next checks in step 352 the feature mask to see if the processor is a WSP, LSP, or SRP. If it is and the processor is active (i.e., not in the standby mode), then the agent proceeds to decision diamond 316. If it is not, the agent proceeds to step 356.

Returning again to step 336, the agent determines whether the manager found one or more unmatched serial numbers. If not, the agent proceeds to step 320 in which the license mode is set to the NO-LICENSE mode. If so, the agent proceeds to step 360.

If in either of steps 360 and 366, the agent determines that the manager found the feature limits to be exceeded or the license to be expired, respectively, the agent proceeds to step 320.

If in both of steps 360 and 366, the agent determines if the manager found that the feature limits are within licensed limits and the license is unexpired, respectively, the agent proceeds to step 370.

In step 370, the agent determines whether the processor is an active WSP, LSP, or SRP. If so, the agent proceeds to step 320. If not, the agent proceeds to step 356.

As shown by steps 336, 360, 366, and 370, the timer value is relevant only if there is a license error. If there are no errors, the switch goes to LICENSE-NORMAL mode, even if the license error timer is expired. If this were not the case, there would be no way to get out of the NO-LICENSE mode once the timer had expired.

Figure 3A:
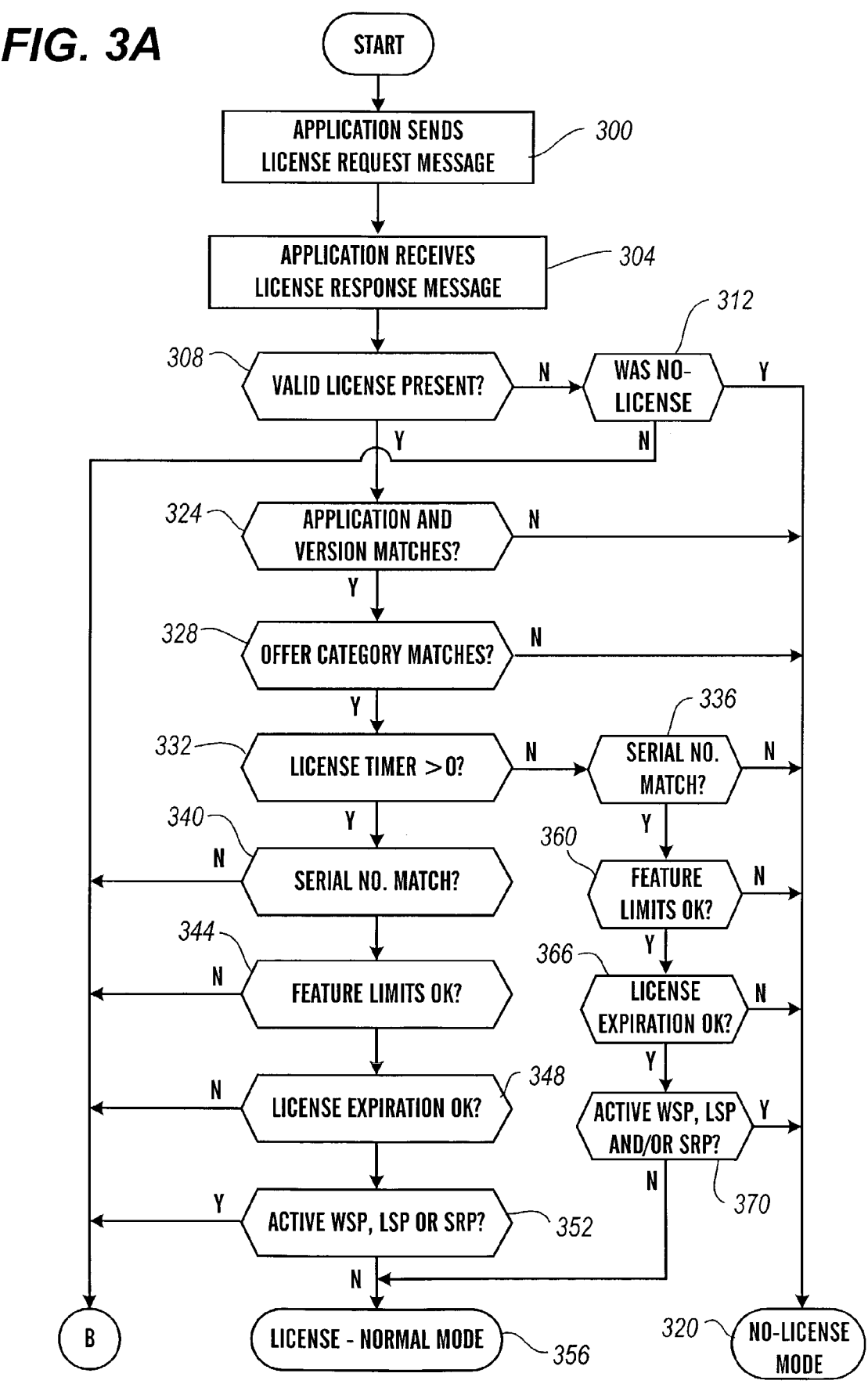
FIGS. 3A and 3B are flows chart depicting an algorithm of the telecommunication application according to yet another embodiment of the present invention.
Figure 3B:
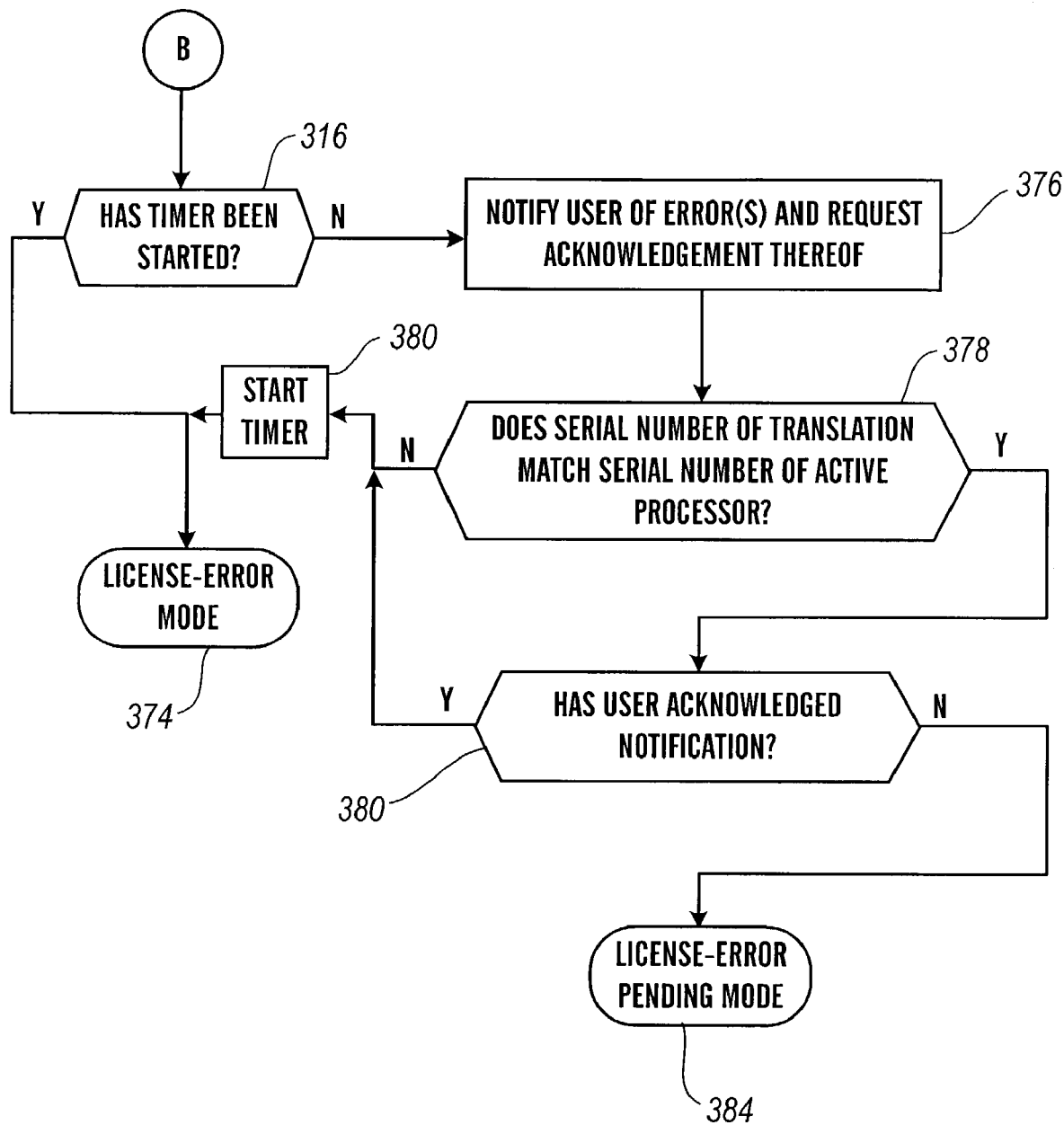

Referring now to FIG. 3B, the agent 124 in decision diamond 316 determines whether or not the timer 126 has been started. In other words, the agent determines whether the timer value is the full value of the grace period. When the timer has been started, the agent 124 proceeds to step 374 and sets the licensing mode to the LICENSE-ERROR mode. When the timer has not been started, the agent proceeds to step 376.

In step 376, the user is notified of the error(s) identified by the license manager and/or mode setting agent, as noted previously, and a request for acknowledgement of the error(s) is provided to the user. Typically, the errors and request are displayed to the user on a GUI. This step is discussed in detail below in connection with FIG. 6.

Next in decision diamond 378, the agent 124 compares the serial number(s) in translation information (or stored switching system configuration data) with the serial number(s) of the processor(s) and determines whether the serial number(s) match. This step is performed to prevent a user from performing administration off-switch on another validly licensed system. This would allow the user never to have to acknowledge the license error(s), start the timer, and ultimately lose call processing. To block this form of theft, the translation information for the system includes the serial number of the processor(s) of the system that last modified the translation information in encrypted format. When a system is initialized, the agent thus checks to see if the serial number encrypted in the translation information matches the serial number(s) of the processors.

If it is determined that the serial number(s) encrypted in the translation information does not match the serial number (s) of the processor(s) (or the translation information was modified using another system), then the agent automatically starts the timer in step 380 without a user acknowledgment and proceeds to step 374 (in which the current licensing mode is set to the LICENSE-ERROR mode). Because the license number(s) do not match, the user also cannot use the provided translation information for system configuration.

If it is determined that the serial number(s) encrypted in the translation information matches the serial number(s) of the processor(s), then the agent proceeds to decision diamond 380.

In decision diamond 380, the agent determines whether or not the user has acknowledged the license error(s). When the user has acknowledged the license error(s), the agent causes the timer to start in step 380 and permits the user to perform the requested actions, such as performing administration changes. When the user has not acknowledged the license error(s), the agent sets the licensing mode to the LICENSE-ERROR-PENDING mode in step 384 and refuses to perform the requested actions.

Whenever the system 100 enters the LICENSE-NORMAL mode, the agent clears any LICENSE-ERROR, LICENSE-ERROR-PENDING, or NO-LICENSE alarms, stops the license error timer (if running) and resets the timer to the full duration of the grace period, and makes a timer save request of this duration to the license manager.

Whenever the system 100 enters the LICENSE-ERROR or LICENSE-ERROR-PENDING modes, the agent generates a major (license-error) alarm, logs the error into the system security log, and initiates the license error countdown timer.

Whenever the system 100 enters NO-LICENSE mode, the agent generates a major (no-license) alarm (that is different from the alarm generated by the agent on entry into the LICENSE-ERROR or LICENSE-ERROR-PENDING modes), logs the error into the system security log, and provides a timer save request of zero hours to the license manager.

When the system 100 is operating in the NO-LICENSE, LICENSE-ERROR-PENDING, or LICENSE-ERROR mode, the alarm is presented to the user in a suitable mode or modes. For example, a suitable error message can be displayed on the initial login screen for the system and/or a key or other indicator can be illuminated on one or more telephone sets and/or on another part of the system hardware. The agent can also provide an alarm notification to outside service personnel. In one configuration, a major alarm (entry into any of the LICENSE-ERROR-PENDING, LICENSE-ERROR, and NO-LICENSE modes) is announced by illuminating a warning light on the system 100 hardware, dialing out an alarm message to maintenance personnel using the PSTN, illuminating a light on a station, displaying a warning message on the login screen, and querying the system 100 for license error status.

In the above system configuration, after the LICENSE-ERROR-PENDING mode is entered the user is presented with a warning screen immediately upon login to the system. The warning screen advises the user that the system is in LICENSE-ERROR PENDING mode and that they must either acknowledge the presence of the license error and initiate the timer 126 or log off. The user is not allowed to perform any other administrative or maintenance function in the system unless the license error is acknowledged and the timer 126 initiated. This configuration ensures that the timer 126 is not initiated without guaranteeing that someone is notified. This method also allows a user to avoid having to start the timer (and enter the LICENSE-ERROR mode) if he is willing to give up the ability to log on to the system and issue specified commands (e.g., perform system administration activities). The command to load a license file is typically the only command that the system will process in the LICENSE-ERROR-PENDING mode. This option can allow the user with an especially critical application to avoid completely the risk of its system going out of service at the cost of performing system administration. The method protects against unauthorized use of the application since the system is not fully usable (i.e., administration is blocked) until the timer is initialized. Once the timer is initialized, then the system will be completely unusable (call processing is blocked) if the timer is allowed to expire without correcting the license error(s).

Figure 6:
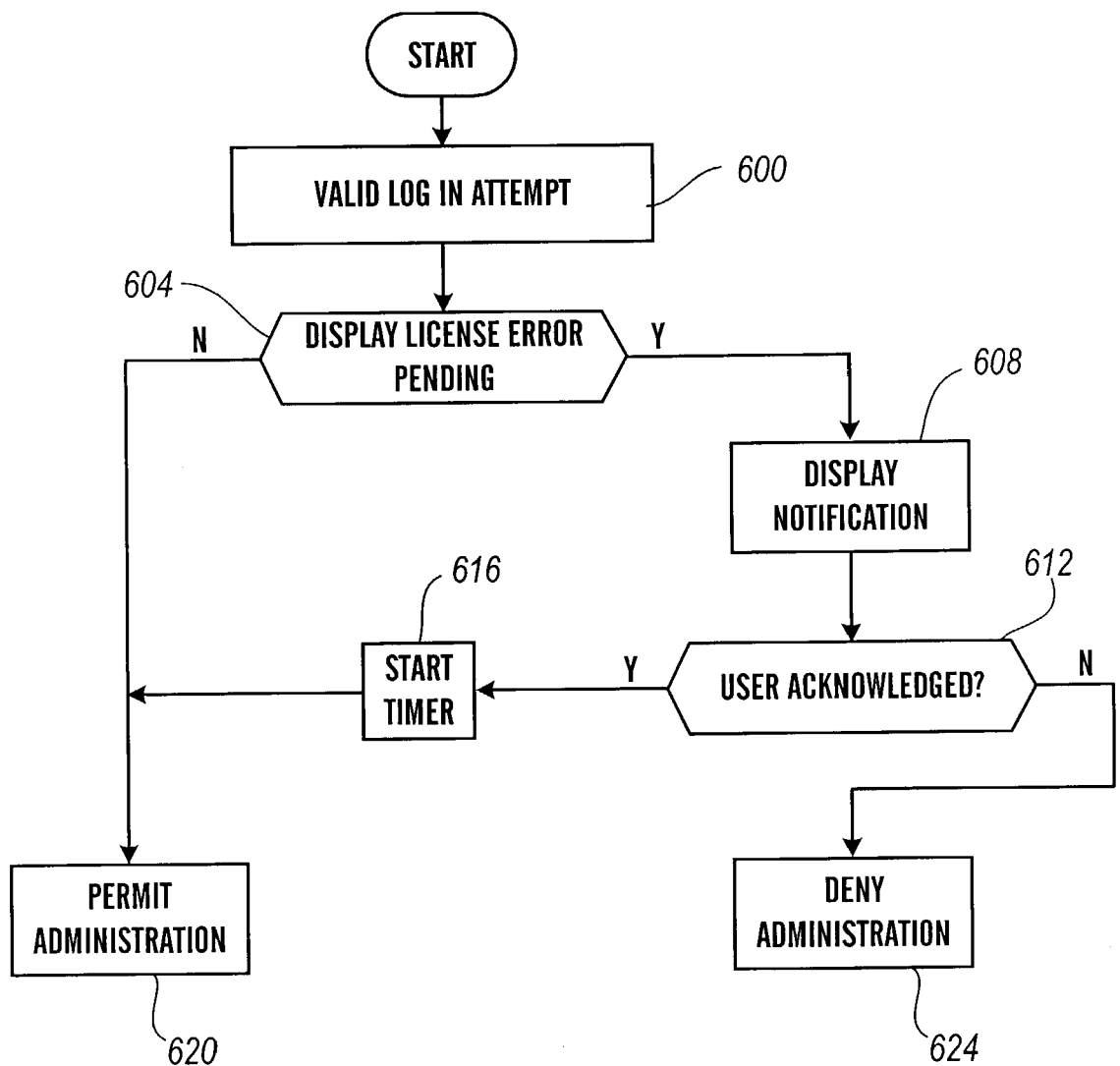
FIG. 6 is a flow chart depicting an algorithm of the license manager according to yet a further embodiment of the present invention.

FIG. 6 shows the operation of the application 114 when a user attempts to log onto the system 100 while FIGS. 3A and 3B show the operation of the application upon system initialization. In step 600, a valid log in attempt is received from the user. If the log in attempt is invalid, the application 114 performs none of the downstream steps discussed below. As will be appreciated, an invalid login occurs when the user enters an invalid user name or invalid password.

Next in decision diamond 604, the application determines whether or not it must display that one or more license error(s) is pending and identify the error(s). If not, the application permits the user to perform administration activities in step 620. If so, the application proceeds to step 608 and displays the notification and requests acknowledgment of the notification.

In decision diamond 612, the application determines whether or not the user has acknowledged the notification. When acknowledgment is received, the timer 126 is started in step 616 and the application permits the user to perform administration activities in step 620. When acknowledgment is not received, the application in step 624 denies the administration request and refuses to perform any administration activities.

Figure 5:
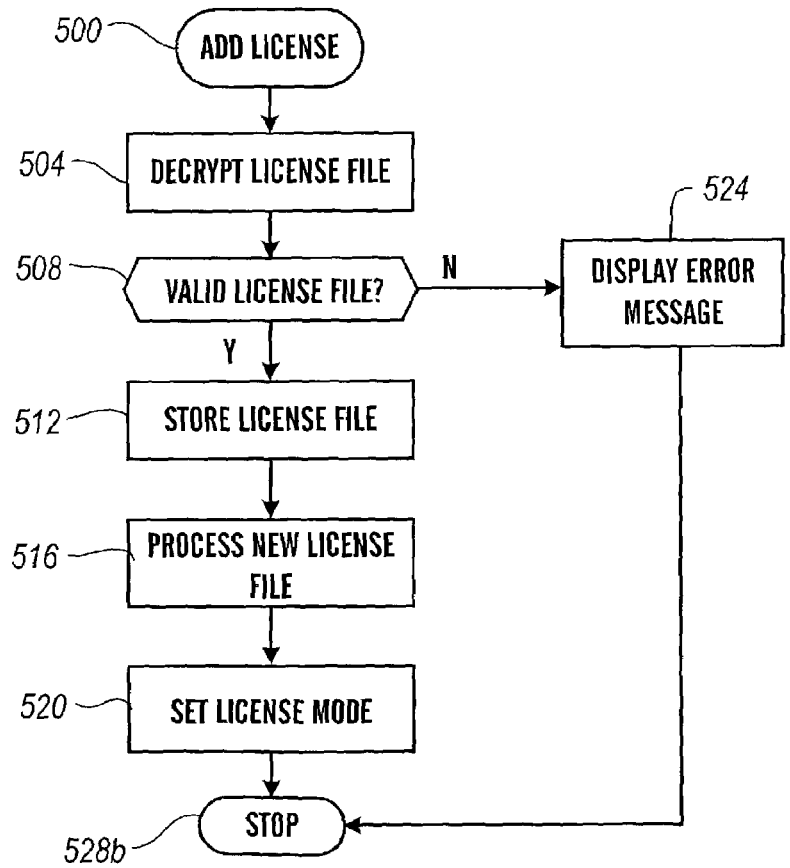
FIG. 5 is a flow chart depicting an algorithm of the license manager according to yet a further embodiment of the present invention.

FIG. 5 depicts the operation of the license manager when a new license file is received by the telecommunication switching system 100. In step 500, the ADD LICENSE command is invoked. In step 504, the license manager decrypts the new license file.

In step 508, the license manager performs a series of checks to determine if the license file is valid. The license manager confirms that the serial number contained in the license file matches the serial number of the active processor, that the license has not expired, that the version contained in the license file matches the software version loaded onto the switching system 100, that the offer category contained in the license file matches the offer category contained in the translation files of the system 100, data integrity using a checksum or other suitable approach, and that the license file length and format are correct.

If one or more of the preceding queries is not confirmed, the license manager proceeds to step 524 and displays a suitable error message to the user and terminates operation in step 528.

If each of the queries is confirmed, the new license file is stored in translation in step 512. The new license file overwrites the license file already in memory.

The license manager then processes the new license file in step 516. The license manager activates and deactivates features and sets new limits in accordance with the new license file.

Next in step 520, the license manager invokes the mode setting agent to set the license mode. If the mode was LICENSE-NORMAL, the new license file was successfully installed, no feature limits are exceeded, and the system is a simplex system, the mode remains LICENSE-NORMAL. If the preceding facts are true except that the system is a duplex system and if the duplicated processor has the correct serial number, the mode remains LICENSE-NORMAL. If the mode was LICENSE-NORMAL and the new license installed successfully but there were feature limits exceeded, the feature limits shall be set in step 416 as specified by the new license file, and the system shall enter the LICENSE-ERROR-PENDING mode followed later by the LICENSE-ERROR mode. If the mode was LICENSE-NORMAL and the new license file was not successfully installed, the mode remains unchanged. If the mode was LICENSE-ERROR or LICENSE-ERROR-PENDING, the new license installed successfully, no feature limits are exceeded, and the system is a simplex system, the mode is set to the LICENSE-NORMAL mode. If the preceding facts are true except that system is a duplex system and if the duplicated processor has the correct serial number, the mode is set to the LICENSE-NORMAL mode. If the mode was LICENSE-ERROR or LICENSE-ERROR-PENDING and the new license file was successfully installed but there were feature limits exceeded, the feature limits are set in step 416 as set forth in the new license file, the errors are logged, and an error message displayed. The license mode remains unchanged. If the mode was LICENSE-ERROR or LICENSE-ERROR-PENDING and the new license could not be installed, the mode is unchanged. If the mode was NO-LICENSE, the new license file was successfully installed, no feature limits are exceeded, and the system is a simplex system, the mode is set to LICENSE-NORMAL. If the preceding facts are true except that system is a duplex system and if the duplicated processor has the correct serial number, the mode is set to the LICENSE-NORMAL mode. If the mode was NO-LICENSE and the new license file was successfully installed but there were feature limits exceeded, the feature limits are set in step 416 as set forth in the new license file, the errors are logged, an error message displayed, and the mode remains NO-LICENSE. If the mode was NO-LICENSE and the new license file was not successfully installed, the mode remains NO-LICENSE.

A number of variations and modifications of the invention can be used. It would be possible to provide for some features of the invention without providing others.

For example, the division of the various functions performed by the license manager and mode setting agent modules are different. For example, the license manager can perform all or part of the licensing-related functions of the mode setting agent or the mode setting agent can perform all or part of the licensing-related functions of the license manager.

In another alternative embodiment, the mode setting agent 124 is not a part of the telecommunication application 114.

In another alternative embodiment, only specified logins (names and/or passwords) can successfully acknowledge license error(s). If a customer wants to be assured that a specific person or group of individuals will be notified before the timer starts, then the ability to acknowledge the license error and start the timer is limited to a specific login or group of logins. (e.g., specific pair(s) of login(s) and password(s))Although any user who logs in would see the notification, the system would restrict the actual acknowledgment to the specified logins, thus ensuring the appropriate notification. This ensures that the timer does not start until the appropriate, responsible personnel have been notified.

In yet another alternative embodiment, the license manager and/or mode setting agent 124 are implemented as software and/or hardware such as a logic circuit, e.g., an application specific integrated circuit.

In yet another alternative embodiment, any other applications running on the telecommunication switching system 100 can utilize the same mechanism as the mode setting agent 124 to determine if they are to be allowed to execute and what options they execute.

In yet a further alternative embodiment, the above techniques are applied with other telecommunication and/or non-telecommunication computational architectures having duplicated computational components. The computational components can be hardware, software, or a combination of the two.

In yet a further alternative embodiment, the license file can include fields for any number of unique identifiers for the same or differing types of hardware components. For example, for a license verification to be successful the license manager could require that there be matches for serial numbers not only of a control processor but also of an application specific integrated circuit or another type of hardware component.

In yet another embodiment, unsuccessful license verification causes only the contacting telecommunication application and not other successfully validated telecommunication applications or other parts of the system to be set to a mode other than the LICENSE NORMAL mode.

In yet another embodiment, the sets of features enabled/disabled in the LICENSE-NORMAL and LICENSE-ERROR modes are different. The features that can be enabled and disabled in each mode comprise call routing or vectoring, to name but a few. In the LICENSE-NORMAL mode all of these features are enabled. In contrast, only some of these features are enabled in the LICENSE-ERROR mode.

In yet another embodiment, the present invention is used to enable/disable an application executed by a server in addition to or in lieu of a switch. This embodiment is particularly useful in monitoring licensing in multi-mode contact centers which receive a broad variety of contact types, such as telephone calls, electronic mail, and contacts via a Web browser.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for protecting actuation of a computational component in a telecommunication system, the computational component operating in a first licensing mode, comprising:
identifying the occurrence of a predetermined licensing event;
notifying a user of the predetermined licensing event;
determining whether or not the user has acknowledged receipt of the notice within a selected time period;
when the user fails to acknowledge receipt of the notice within the selected time period, causing the computational component to operate in a second licensing mode; and
when the user acknowledges receipt of the notice within the selected time period, causing the computational component to operate in a third licensing mode, wherein the first, second, and third licensing modes provide for a first, second, and third sets of operations, respectively, and wherein the first and third sets of operations each differ from the second set of operations.

2. The method of claim 1, wherein the predetermined licensing event is associated with the absence of a valid license, wherein the first, second, and third sets of operations each comprise a common subset of features, and the common subset of features comprise a plurality of call processing functions.

3. The method of claim 1, wherein in the first licensing mode the computational component is validly licensed and in the second and third licensing modes the computational component is not validly licensed.

4. The method of claim 2, wherein the computational component is a telecommunication application and in the first, second, and third licensing modes the common subset of features comprises a plurality of call vectoring, voice mail, call forwarding off net, DCS Internet working, enhanced conferencing, IP trunks, holiday vectoring, and automatic call distribution.

5. The method of claim 4, further comprising:
after a predetermined period of time has elapsed, causing the computational component to operate in a fourth licensing mode, the fourth licensing mode being different from the first, second, and third licensing modes, wherein in the fourth licensing mode the features in the common subset of features are disabled.

6. The method of claim 5, wherein in the fourth licensing mode the computational component is not validly licensed and the computational component permits only outgoing and incoming calls to and/or from a predefined set of numbers.

7. The method of claim 1, further comprising:
comparing a first identifier associated with the telecommunication system with a second identifier in translation information to be used for configuring the telecommunication system;
when the first and second identifiers are different, causing the computational component to operate in the third licensing mode even when the user fails to acknowledge receipt of the notice within the selected time period; and
when the first and second identifiers are the same, only causing the computational component to operate in the third licensing mode when the user acknowledges receipt of the notice within the selected time period.

8. The method of claim 1, further comprising:
initiating a timer when the user acknowledges receipt of the notice within the selected time period, wherein the timer tracks the amount of time that the third licensing mode is in effect.

9. The method of claim 1, wherein in the first and third licensing modes a common subset of operations are performed but the common subset of operations are not performed in the second licensing mode.

10. The method of claim 9, wherein the common subset of operations comprise at least one of call processing features, system administration functions, and system maintenance functions.

11. The method of claim 4, further comprising:
determining that the predetermined licensing event has been corrected; and
returning the computational component to the first licensing mode.

12. The method of claim 1, wherein an acknowledgment is received from a first user within the selected time period and further comprising:
determining whether the first user is authorized to acknowledge the notification;
when the first user is not authorized to acknowledge the notification, ignoring the notification and not causing the computational component to operate in the third licensing mode; and
when the first user is authorized to acknowledge the notification, causing the computational component to operate in the third licensing mode.

13. A computer readable medium storing instructions for performing the steps of claim 1.

14. A telecommunication system comprising a computational component, the computational component operating in a first licensing mode, comprising:
identifying means for identifying the occurrence of a predetermined licensing event;
notification means for notifying a user of the predetermined licensing event; and
determining means for determining whether or not the user acknowledges receipt of the notice within a selected time period and, when the user fails to acknowledge receipt of the notice within the selected time period, causing the computational component to operate in a second licensing mode, and, when the user acknowledges receipt of the notice within the selected time period, causing the computational component to operate in a third licensing mode, wherein the first, second, and third licensing modes provide for a first, second, and third sets of operations, respectively, and wherein each of the first and third sets of operations differ from the second set of operations.

15. The system of claim 14, wherein the predetermined licensing event is associated with the absence of a valid license, wherein each of the first, second, and third sets of operations comprise a common subset of features, and the common subset of features comprise a plurality of call processing functions.

16. The system of claim 14, wherein in the first licensing mode the computational component is validly licensed and in the second and third licensing modes the computational component is not validly licensed.

17. The system of claim 15, wherein the computational component is a telecommunication application and in the first, second, and third licensing modes the common subset of features comprises a plurality of call vectoring, voice mail, call forwarding off net, DCS Internet working, enhanced conferencing, IP trunks, holiday vectoring, and automatic call distribution.

18. The system of claim 17, wherein the determining means, after a predetermined period of time has elapsed, causes the computational component to operate in a fourth licensing mode, the fourth licensing mode being different from the first, second, and third licensing modes, wherein in the fourth licensing mode the features in the common subset of features are disabled.

19. The system of claim 18, wherein in the fourth licensing mode the computational component is not validly licensed and the computational component permits only outgoing and incoming calls to and/or from a predefined set of numbers.

20. The system of claim 14, further comprising:
means for comparing a first identifier associated with the telecommunication system with a second identifier in translation information to be used for configuring the telecommunication system and, when the first and second identifiers are different, causing the computational component to operate in the third licensing mode even when the user fails to acknowledge receipt of the notice within the selected time period, and, when the first and second identifiers are the same, only causing the computational component to operate in the third licensing mode when the user acknowledges receipt of the notice within the selected time period.

21. The system of claim 14, further comprising:
means for initiating a timer when the user acknowledges receipt of the notice within the selected time period, wherein the timer tracks a period of time in which the third licensing mode is in effect.

22. The system of claim 14, wherein in the first and third licensing modes a common subset of operations are performed but the common subset of operations are not performed in the second licensing mode.

23. The system of claim 22, wherein the common subset of operations comprise at least one of call processing features and system administration functions.

24. The system of claim 17, further comprising:
means for determining that the predetermined licensing event has been corrected; and
means for returning the computational component to the first licensing mode.

25. A telecommunication system comprising a computational component, the computational component operating in a first licensing mode, comprising:
a license manager operable to identify the occurrence of a predetermined licensing event; and
a mode setting agent operable to notify a user of the predetermined licensing event and determine whether or not the user acknowledges receipt of the notice within a selected time period, wherein, when the user fails to acknowledge receipt of the notice within the selected time period, the mode setting agent is operable to cause the computational component to operate in a second licensing mode, and, when the user acknowledges receipt of the notice within the selected time period, the mode setting agent is operable to cause the computational component to operate in a third licensing mode, wherein the first, second, and third licensing modes provide for a first, second, and third sets of operations, respectively, and wherein the first and third sets of operations differ from the second set of operations.

26. The system of claim 25, wherein the predetermined licensing event is associated with the absence of a valid license, wherein each of the first, second, and third sets of operations comprise a common subset of features, and the common subset of features comprise a plurality of call processing functions.

27. The system of claim 25, wherein in the first licensing mode the computational component is validly licensed and in the second and third licensing modes the computational component is not validly licensed.

28. The system of claim 26, wherein the computational component is a telecommunication application and in the first, second, and third licensing modes the common subset of features comprises a plurality of call vectoring, voice mail, call forwarding off net, DCS Internet working, enhanced conferencing, IP trunks, holiday vectoring, and automatic call distribution.

29. The system of claim 28, wherein the mode setting agent, after a predetermined period of time has elapsed, causes the computational component to operate in a fourth licensing mode, the fourth licensing mode being different from the first, second, and third licensing modes, wherein in the fourth licensing mode the features in the common subset of features are disabled.

30. The system of claim 29, wherein in the fourth licensing mode the computational component is not validly licensed and the computational component permits only outgoing and incoming calls to and/or from a predefined set of numbers.

31. The system of claim 25, wherein the mode setting agent is operable to compare a first identifier associated with the telecommunication system with a second identifier in translation information to be used for configuring the telecommunication system and, when the first and second identifiers are different, cause the computational component to operate in the third licensing mode even when the user fails to acknowledge receipt of the notice within the selected time period, and, when the first and second identifiers are the same, only cause the computational component to operate in the third licensing mode when the user acknowledges receipt of the notice within the selected time period.

32. The system of claim 25, wherein the mode setting agent is operable to cause initiation of a timer when the user acknowledges receipt of the notice within the selected time period, wherein the timer tracks a period of time in which the third licensing mode is in effect.

33. The system of claim 25, wherein in the first and third licensing modes a common subset of operations are performed but the common subset of operations are not performed in the second licensing mode.

34. The system of claim 33, wherein the common subset of operations comprise at least one of call processing features and system administration functions.

35. The system of claim 28, wherein the mode setting agent is operable to determine that the predetermined licensing event has been corrected; and return the computational component to the first licensing mode.

* * * * *